(12) United States Patent
Lehmann Madsen et al.

(10) Patent No.: US 11,607,826 B2
(45) Date of Patent: Mar. 21, 2023

(54) METHOD OF MANUFACTURING AT LEAST TWO PREFORMS FOR MOULDING A WIND TURBINE BLADE

(71) Applicant: LM Wind Power International Technology II ApS, Kolding (DK)

(72) Inventors: Kristian Lehmann Madsen, Fredericia (DK); Lars Nielsen, Skanderborg (DK); Klavs Jespersen, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 0 days.

(21) Appl. No.: 16/771,577

(22) PCT Filed: Dec. 11, 2018

(86) PCT No.: PCT/EP2018/084353
§ 371 (c)(1),
(2) Date: Jun. 10, 2020

(87) PCT Pub. No.: WO2019/115522
PCT Pub. Date: Jun. 20, 2019

(65) Prior Publication Data
US 2020/0398459 A1  Dec. 24, 2020

(30) Foreign Application Priority Data
Dec. 14, 2017  (EP) .................................. 17207315

(51) Int. Cl.
*B29C 33/30* (2006.01)
*B29D 99/00* (2010.01)
*F03D 1/06* (2006.01)

(52) U.S. Cl.
CPC ........ *B29C 33/308* (2013.01); *B29D 99/0028* (2013.01); *F03D 1/0675* (2013.01); *F05B 2230/00* (2013.01)

(58) Field of Classification Search
CPC . B29C 33/308; B29C 33/307; B29D 99/0028; F03D 1/0675; F05B 2230/00; Y02E 10/72
See application file for complete search history.

(56) References Cited

U.S. PATENT DOCUMENTS

| | | | |
|---|---|---|---|
| 6,298,896 B1 | 10/2001 | Sherrill et al. | |
| 9,234,500 B2 * | 1/2016 | Frederiksen | ............ B29C 70/48 |
| 10,052,827 B2 * | 8/2018 | Rotter | ..................... B29C 73/32 |
| 10,953,611 B2 * | 3/2021 | Lehmann Madsen | ...................... B29D 99/0028 |
| 2010/0024215 A1 | 2/2010 | Torres Martinez | |
| 2011/0285056 A1 | 11/2011 | Davideit et al. | |

FOREIGN PATENT DOCUMENTS

| | | |
|---|---|---|
| WO | 2011009462 A1 | 1/2011 |
| WO | 2012093136 A2 | 7/2012 |

* cited by examiner

*Primary Examiner* — Ryan J. Walters
(74) *Attorney, Agent, or Firm* — Nath, Goldberg & Meyer; Jerald L. Meyer; Tanya E. Harkins

(57) ABSTRACT

The present invention relates to a method and a mould system (66) for manufacturing at least two preforms for moulding a wind turbine blade. The preforms include at least one preform of a first shape and at least one preform of a second shape. The preform mould structure (68) has a moulding surface (70) of variable shape such that the shape of the moulding surface (70) can be varied at least between a first and a second configuration by using actuators.

14 Claims, 6 Drawing Sheets

METHOD OF MANUFACTURING AT LEAST TWO PREFORMS FOR MOULDING A WIND TURBINE BLADE

Figure 1:
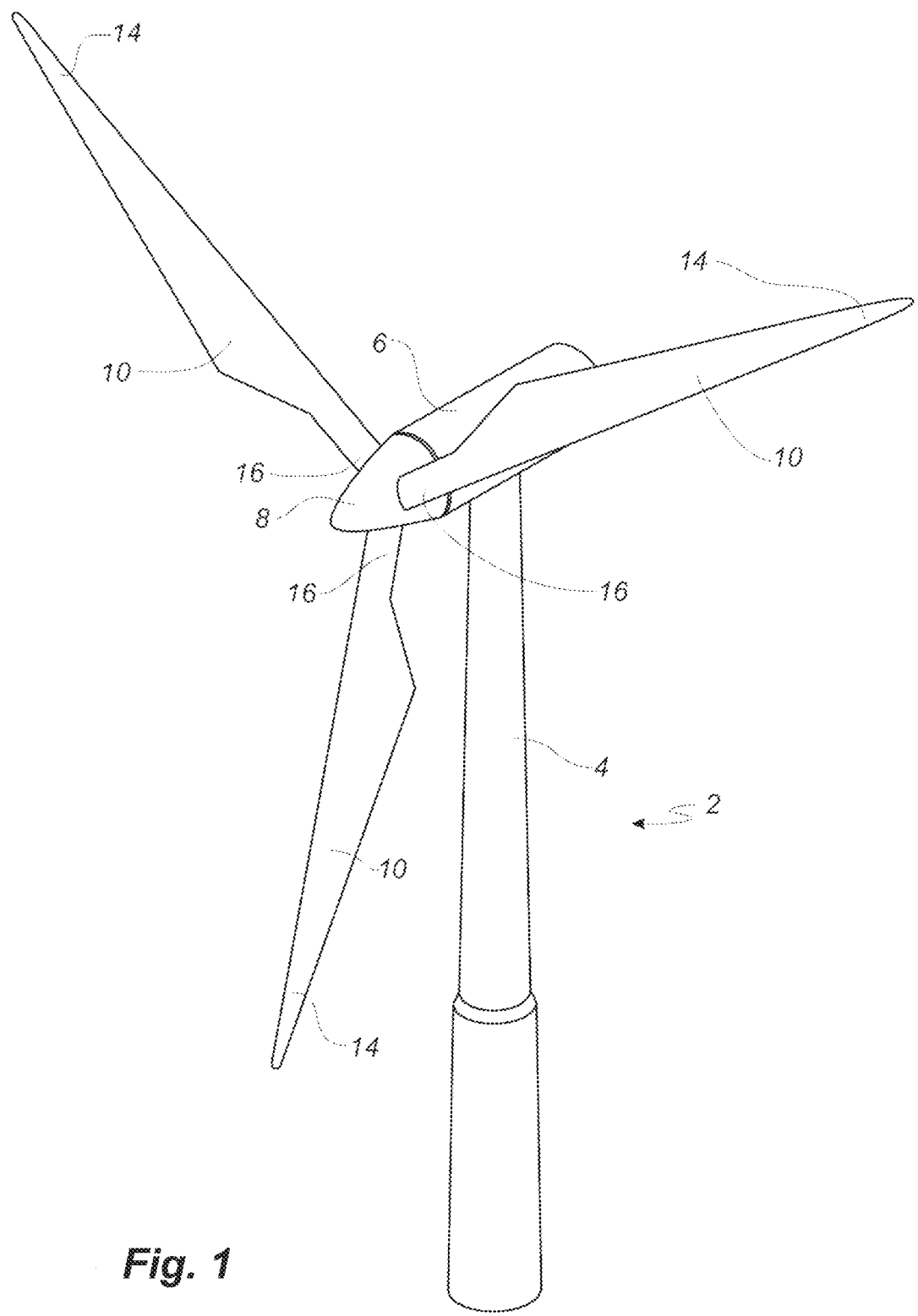

This is a National Phase Application filed under 35 U.S.C. 371 as a national stage of PCT/EP2018/084353, filed Dec. 11, 2018, an application claiming the benefit of European Application No. 17207315.7, filed Dec. 14, 2017, the content of each of which is hereby incorporated by reference in its entirety.

FIELD OF THE INVENTION

The present invention relates to a method of manufacturing at least two preforms for moulding a wind turbine blade, to a mould system and to a method of manufacturing a wind turbine blade.

BACKGROUND OF THE INVENTION

The rotor blades of modern wind turbines capture kinetic wind energy by using sophisticated blade design created to maximise efficiency. There is an increasing demand for large wind blades which may exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using blade moulds. First, a blade gel coat or primer is applied to the mould. Subsequently, fibre reinforcement and/or fabrics are placed into the mould followed by resin infusion. A vacuum is typically used to draw epoxy resin material into a mould. Alternatively, prepreg technology can be used in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by being glued or bolted together substantially along a chord plane of the blade.

In the above-described manufacturing process, preforms may be used. A preform is a shaped arrangement of fibres, such as multiple layers thereof, which has been bound and/or consolidated for later use as part of the fibre lay-up in the blade mould. The rationale for using preforms for blade manufacturing is to reduce cycle time in the blade mould. Also, using preforms may reduce the number of required repairs due to the pre-consolidated structure of the preforms.

In manufacturing a typical wind turbine blade, a number of preforms of different shapes and sizes are needed. This adds to the complexity and cost of manufacturing of preforms. Also, the manufacturing of preforms usually requires a lot of floor space.

It is a first object of the present invention to provide a method of manufacturing preforms that is simple and cost-effective.

It is a further object of the present invention to provide a method of manufacturing preforms that is versatile allows for flexible manufacturing solutions.

SUMMARY OF THE INVENTION

The present inventors have found that one or more of said objects may be achieved by a method of manufacturing at least two preforms for moulding a wind turbine blade, the preforms including at least one preform having a first shape and at least one preform having a second shape, the second shape being different from the first shape, the method comprising the steps of
providing a preform mould structure having a moulding surface of variable shape such that the shape of the moulding surface can be varied at least between a first and a second configuration,
providing at least one actuator for changing the shape of the moulding surface between the first and the second configuration,
moulding at least one preform having the first shape on the moulding surface having the first configuration, and
moulding at least one preform having the second shape on the moulding surface having the second configuration.

The present inventors have found this inventive method to be particularly flexible and efficient, allowing manufacturing preforms of various shapes using the same mould structure and the same moulding surface. This was found to result in a reduction of cost and space requirements for preform moulding. In particular, the method of the present invention makes it possible to manufacture preforms for different parts and different halves of a wind turbine blade, using the same mould structure and the same moulding surface.

The preform mould structure may comprise, or may consist of, at least one sheet, such as a steel sheet. In other embodiments, the mould structure may comprise, or may consist of, a composite sheet or a plastic sheet, or one or more composite plates or planks. Preferably, the sheet is a bendable sheet, such a bendable steel sheet. In other embodiments, the preform mould structure may comprise a plurality of sheets, such as rigid or bendable sheets, which are interconnected, for example hingedly interconnected. Typically, each sheet will comprise a bottom surface and an opposing upper surface, the upper surface constituting at least part of the moulding surface. The moulding surface could also be provided on a foil or a layer on top of the upper surface of the sheet(s). The bottom surface can advantageously be engaged by at least one actuator for changing the shape of the sheet or the shape of the interconnected sheets. In one embodiment, the preform mould structure comprises a planar, bendable sheet, preferably made from steel.

Preferably, the first and the second shape of the preforms differ in terms of curvature of the preforms. Likewise, preferably the first and the second configuration of the moulding surface differ in terms of the curvature of the moulding surface. It is preferred that the first and the second configuration of the moulding surface differ in terms of the shape and/or curvature of the moulding surface over at least 80% of the length of the moulding surface, preferably over at least 90% of the length or over substantially the entire length of the moulding surface. Thus, preferably the moulding surface is flexible over substantially its entire length.

In some embodiments, the first and the second configuration vary across at least 80%, such as at least 90% of the moulding surface, or substantially across the entire moulding surface.

The actuator may be a pneumatic actuator, a hydraulic actuator, an electrical actuator, a high output force mechanical actuator or a thermochemical actuator. The actuator will typically comprise a fixed part, such as a hollow cylinder, and a movable element, such as a piston or a rod, that is movable with respect to the fixed part. The movable element may be a piston, a shaft or a rod that is slidably received in the fixed part. Advantageously, the actuator will also comprise an expandable medium to drive the movable element.

In a preferred embodiment, the actuator is a linear actuator, such as a pneumatic linear actuator or a hydraulic linear actuator, preferably a hydraulic linear actuator.

It is preferred that the actuator comprises a movable piston or rod which is engaging the bottom surface of a sheet of the preform mould structure. As described above, the sheet, or a part thereof, such its upper surface or a part fixed to the sheet, constitutes at least part of the moulding surface. The movable piston or rod may engage the bottom surface of such sheet directly or via a connecting element, such as wedge-shaped part. The end of the movable piston or rod may be fixed to the bottom surface, e.g. via a connecting element, to enable bending or pushing the sheet upward, or bending or pushing the sheet downward. Thus, according to a preferred embodiment, the change between the first and the second configuration of the moulding surface is achieved by extension and/or retraction a movable actuator part fixed to a bottom surface of the mould structure, such as the bottom surface of a sheet, such as a bendable sheet.

In a preferred embodiment, the preform mould structure has a moulding surface of variable shape such that the shape of the moulding surface can be varied over at least 80% of the entire length, preferably at least 90%, most preferred the entire length, of the moulding surface. To this end, it is preferred that at least one actuator is provided at a front end of the preform mould structure and least one actuator is provided at a rear end of the mould structure. Preferably, one or more additional actuators are provided along the mould structure in between the front end actuator and the rear end actuator. Thus, the front end actuator is preferably provided within a distance of not more than 1 meter from the front end of the mould structure, and the rear end actuator is preferably provided within a distance of not more than 1 meter from the rear end of the mould structure. The front end and the rear end of the mould structure preferably apply to ends of the mould structure when seen in its longitudinal orientation.

The respective moulding steps will typically involve the lay-up of a fibre material, such as glass fibres, together with a binding agent for binding the fibre material to form the preform. In other embodiments, the fibre material may comprise carbon fibres and/or hybrid fibres. The fibre lay-up will typically be accomplished using one or more fibre lay-up devices. Subsequent, the fibre material and the binding agent will typically be heated to bind and consolidate the fibre material. This will usually be done using one or more heating devices, such as an oven.

Preferably, a binding agent is added to the fibres prior to the heating step. Such binding agent is preferably present in an amount of 0.1-15 wt % relative to the weight of the fibre material. The binding agent may also be present in an amount of 5-40, preferably 10-20, gram per square meter of glass surface.

Typically, the fibre material is placed successively onto the moulding surface of the preform mould structure. The fibre material may comprise glass fibres, carbon fibres or a combination thereof. According to a preferred embodiment of the method, a glass fibre material is placed into the preform mould structure, such as multiple layers of glass fibre material. The fibre material may advantageously be brought into contact with a binding agent before or during the fibre lay-up.

The fibre lay-up process may involve aligning a plurality of fibres, or fibre layers, substantially unidirectionally. In one embodiment, the fibre material may include fibre rovings, such as glass fibre rovings. The lay-up process may include placing multiple single roving bundles into the mould, the roving bundles being preferably aligned unidirectionally.

The binding agent can be added simultaneously with the fibres or subsequently to fibre lay-up. The binding agent is preferably present in an amount of 0.1-15 wt % relative to the weight of the fibre material. The binding agent may also be present in an amount of 5-40, such as 10-20, grams per m2 of glass surface. In preferred embodiments, the binding agent is present in an amount of 0.5-5 wt %, preferably 0.5-2.5 wt %, relative to the weight of the fibre material. Advantageously, the binding agent is a thermoplastic binding agent. The binding agent may comprise a polyester, preferably a bisphenolic polyester. The binding agent may also comprise a vinyl ester.

In a preferred embodiment, the preform moulding step involves heating the fibre material and the binding agent to a temperature of between 40 and 160° C., preferably between 90 and 160° C.

An example of a suitable binding agent is a polyester marketed under the name NEOXIL 940. Examples include NEOXIL 940 PMX, NEOXIL 940 KS 1 and NEOXIL 940 HF 2B, all manufactured by DSM Composite Resins AG. Another example is a polyester resin marketed under the name C.O.I.M. FILCO® 661 FPG 005, which is a bisphenolic unsaturated polyester resin in powder form. Preferably, the binding agent is a polyester, preferably a bisphenolic polyester. In other embodiments, the binding agent is a hotmelt adhesive or based on a prepreg resin.

In a preferred embodiment, the preforms manufactured according to the afore-mentioned method are used as part of the load-carrying main laminate region of a wind turbine blade. The main laminate region is typically formed as a fibre insertion which comprises a plurality of fibre reinforcement layers, e.g. between 20 and 50 layers. However, the preforms could also be used for other parts and regions of a wind turbine blade, such as reinforced parts of the leading edge and/or the trailing edge of the blade.

According to another embodiment, the binding agent is a thermoplastic binding agent. Typically, the fibre rovings are at least partially joined together by means of the binding agent by thermal bonding. In a preferred embodiment, the binding agent is a binding powder, such as a thermoplastic binding powder.

In one embodiment, the preforms of the present invention essentially consist of the fibre material and the binding agent. This means that the preforms contain no more than 10 wt %, preferably not more than 5 wt % or not more than 1 wt %, of material other than fibre material and binding agent relative to the total weight of the preform. According to another embodiment, the preform consists of the fibre material and the binding agent.

In another embodiment, the fibre material used for the preforms of the present invention essentially consists of glass fibres. This means that the fibre material contains not more than 10 wt %, preferably not more than 5 wt % or not more than 1 wt %, of material other than glass fibres relative to the total weight of the fibre material. According to another embodiment, the fibre material consists of glass fibres.

In one embodiment, the binding agent is present in an amount of 1-6 wt % relative to the weight of the fibre material. According to another embodiment, the melting point of the binding agent is between 40 and 220° C., preferably between 40 and 160° C.

According to another embodiment, the binding agent comprises a polyester, preferably a bisphenolic polyester.

In one embodiment of the present invention, each preform essentially consists of the fibre material and the binding agent. According to another embodiment, the fibre material comprises fibre rovings, preferably glass fibre rovings. According to another embodiment, the fibre material comprises a fibre fabric, such as a fibre mat. In another embodiment, a preform may further comprise at least one fibre fabric such as a fibre mat. Fibre rovings may be arranged on top and/or below such fabric.

Preferably, the resulting preforms comprise a consolidated arrangement of material comprising fibres, such as glass fibres, and a binding agent. The preforms can be used to manufacture a wind turbine blade, preferably in a separate moulding process. The preforms can be used in the blade moulding process as part of the fibre lay-up in the blade mould, such as a blade half mould. In a preferred embodiment, the preforms manufactured according to the present invention are placed within the main laminate region of a blade mould, thus constituting part of the main laminate. However, the preforms can also be used for other parts and regions of a wind turbine blade. The preforms may be composite preforms.

Where the preform mould structure comprises one or more sheets, such as one or more bendable sheets, such sheets are preferably elongated sheets, meaning that their length extension is at least twice their width extension. It is preferred that each sheet extends over substantially the entire length of the moulding surface. It is also preferred that each sheet is not separated by hinges or other lines of separation within the sheet.

In one embodiment of the present invention, the preform mould structure has a length of between 15 and 30 meters. In some embodiments of the inventive system or method, the preform has a length of at least 5, 7, 10, 15, 20 or 25 meters. The preform mould structure and/or the preform may also extend to the whole length of the later blade, which may extend up to 100, up to 150 or up to 200 meters.

It is preferred that the first preform shape and second preform shape differ in terms of curvature of the preform, in particular the curvature in the longitudinal direction. Thus, in a preferred embodiment, the first and the second configuration differ in terms of the curvature of the moulding surface. According to another embodiment, the first and the second configuration differ in terms of the curvature of the moulding surface in the longitudinal direction of the moulding surface. This allows for moulding of preforms for different mould halves, i.e. both for an upwind mould half and a downwind mould half, using a single preform mould structure.

In one embodiment, the first and the second configuration do not differ in terms of the curvature of the moulding surface in the transverse direction of the moulding surface. This could be achieved by using a single bendable sheet as the mould structure, wherein the curvature of the sheet is only altered in the longitudinal direction.

According to another embodiment, the preform is for use in a main laminate portion of the wind turbine blade. The main laminate portion is the portion within the blade supporting one or more shear webs.

In a preferred embodiment, the moulding surface can be varied between a concave shape and a convex shape. A convex shape protrudes or bulges outward or generally above the horizontal plane of the surface, while a concave shape generally is curved or bulged inwardly. Thus, the resulting preforms could have a concave or convex shape.

According to another embodiment, the method comprises manufacturing preforms for an upwind blade half and for a downwind blade half using the same preform mould structure. This is made possible by the inventive combination of a flexible mould structure and the actuators for changing the shape of the moulding surface.

In a preferred embodiment, the moulding steps comprise laying a fibre material and a binding agent onto the moulding surface. According to another embodiment, the moulding surface is provided on one or more bendable sheets, such as one or more bendable steel sheets. Thus, the preform mould structure may comprise one or more bendable sheets, such as one or more bendable steel sheets, such as at least two, three or four bendable sheets.

In a preferred embodiment, the moulding surface is provided on a single bendable sheet. Preferably, one actuator is provided at a front end of the sheet and one actuator is provided at a rear end of the sheet. Preferably, one or more additional actuators are provided along the sheet in between the front end actuator and the rear end actuator.

According to another embodiment, the moulding surface is provided on two or more bendable sheets, wherein adjacent sheets are interconnected, preferably hingedly interconnected, along their longitudinal edges. This embodiment allows changing the shape and curvature of the moulding surface both in the longitudinal and in the transverse direction. In a preferred embodiment, one actuator is provided at a front end of each sheet and one actuator is provided at a rear end of each sheet. Preferably, one or more additional actuators are provided along each sheet in between the front end actuator and the rear end actuator of each sheet. Preferably, a movable part of actuator, such as a movable rod or piston, is fixed to a bottom surface of a sheet, either directly or via connecting element.

In a preferred embodiment, the sheets are hingedly interconnected by one or more elastic strips provided in between adjacent sheets. The elastic strips may comprise rubber or other elastic material.

According to another embodiment, the method comprises providing at least three actuators, such as at least four, five or six actuators, for changing the shape of the moulding surface between the first and the second configuration. In other embodiments, the number of actuators for a preform mould structure may be at least ten, at least 25, at least 50, or at least 100.

In some embodiments, the method comprises providing at least two actuators, such as at least three actuators per bendable sheet, wherein preferably no hinges or other separation are provided within each bendable sheet.

In another aspect, the present invention relates to a mould system for manufacturing a preform for moulding a wind turbine blade, the system comprising a preform mould structure having a moulding surface of variable shape such that the shape of the moulding surface can be varied at least between a first and a second configuration, at least one actuator for varying the shape of the moulding surface between the first and the second configuration.

The preform mould structure may comprise, or may consist of, at least one sheet, such as a bendable sheet, such as a bendable steel sheet. In other embodiments, the preform mould structure may comprise a plurality of rigid or bendable sheets which are interconnected, such as hingedly interconnected. Typically, a sheet will comprise a bottom surface and an opposing upper surface, the upper surface constituting at least part of the moulding surface, either directly or through one or more cover layers or foils. The bottom surface can advantageously be engaged by at least one actuator for changing the shape of the sheet or the shape of the interconnected sheets.

Preferably, the actuators support the preform mould structure, wherein preferably a fixed part of each actuators is supported on the ground surface or on a floor plate and wherein the preform mould structure, such as a bendable sheet, is supported by the respective movable parts of each actuator, either directly or through a connecting element.

In some embodiments, the mould system comprises at least two actuators, such as at least three, four, five or six actuators. In other embodiments, the preform mould structure comprises at least two interconnected sheets, such as at least three, four, five or six interconnected sheets. Each sheet may be engaged by one or more actuators, such as at least two, three, four, five or six actuators, preferably at a bottom surface of each sheet.

It is particularly preferred that the shape of the moulding surface is variable substantially over the entire moulding surface. This may be achieved by providing the moulding surface with one or more sheets, preferably flexible sheets, such as bendable sheets, and a suitable number and placement of actuators to be able to vary the shape of the moulding surface over substantially the entire moulding surface of the mould system.

In another aspect, the present invention relates to a method of manufacturing a wind turbine blade, the method comprising the steps of
    manufacturing preforms for moulding an upwind blade half and a downwind blade half according to the afore-described method, wherein the same preform mould is used for at least one preform for the upwind blade half and for the downwind blade half, respectively,
    arranging the preforms in respective upwind blade moulds and downwind blade moulds, optionally together with additional material,
    infusing resin into the respective upwind blade moulds and downwind blade moulds containing the preforms,
    curing or hardening the resin in order to form an upwind blade half and downwind blade half, and
    joining the upwind blade half and the downwind blade half to form a wind turbine blade.

It will be understood that any of the above-described features may be combined in any embodiment of the inventive method or mould system. In particular, features and embodiments described with regard to the mould system may also apply to the method of manufacturing preforms, and vice versa.

In another aspect, the present invention relates to a plurality of preforms obtainable by the afore-described method.

In another aspect, the present invention relates to a method of manufacturing a wind turbine blade part, the method comprising:
    manufacturing a plurality of preforms according to the afore-described method of manufacturing a plurality of preforms,
    arranging the plurality of preforms in a blade mould cavity, optionally together with additional material,
    infusing resin to the blade mould cavity,
    curing or hardening the resin in order to form the blade half.

Typically, the resin infusion step comprises vacuum assisted resin transfer moulding. In a preferred embodiment, the resin dissolves the binding agent of the preform.

The resin for injecting the preform during the manufacturing of a wind turbine blade part or half, may be an epoxy, a polyester, a vinyl ester or another suitable thermoplastic or duroplastic material. In other embodiments, the resin may be a thermosetting resin, such as epoxy, vinyl ester or polyester, or a thermoplastic resin, such as nylon, PVC, ABS, polypropylene or polyethylene.

The present invention also relates to a blade obtainable by the afore-mentioned method of manufacturing a wind turbine blade.

In another aspect, the present invention relates to a moulding system for manufacturing a preform for a wind turbine blade, the moulding system comprising
    a mould structure comprising an at least partly perforated sheet, the sheet comprising a moulding surface,
    airflow generation means for inducing airflow to pass through the perforated sheet towards the moulding surface.

It has been found by the present inventors that by supplying an airflow to a layered fibre arrangement, the fibre layers can be made to float on a layer of air supplied from underneath. Thus, such moulding system allows for an efficient heating process of multiple fibre layers and a binding agent, when moulding and consolidating a preform for a wind turbine blade. In particular, it was found that the fibre layers heat up more rapidly when supplying the above-mentioned airflow, thus saving time and cost.

Typically, the at least partly perforated sheet has an upper surface and an opposing bottom surface. The upper surface provides at least part of the moulding surface. The airflow is advantageously induced to pass from underneath the perforated sheet, i.e. from the side which is facing its bottom surface, upward through the perforated sheet towards the other side, i.e. the side facing the upper surface. It is thus preferred that the airflow creates a lift of any fibre material placed onto the moulding surface.

Typically, a fibre material, such as glass fibres, and a binding agent will be arranged on the moulding surface. Subsequently, the airflow can be generated and passed through the perforated sheet towards the moulding surface containing the fibre material and the binding agent. Preferably, the airflow is an airflow having a temperature of between 40 and 200° C., such as between 80 and 180° C. In a preferred embodiment, the sheet comprises, or is made of, steel. It could either be completely perforated over its entire moulding surface or only part of the moulding surface could be perforated. For example, 10% or more, such as 25% or more of the moulding surface could be perforated.

Subsequently, a vacuum bag or foil can be placed on the fibre material and binding agent and negative pressure can be applied to the fibre material to consolidate the same, optionally while applying heat.

The airflow generation means may comprise a fan or an air pump. According to a preferred embodiment, the moulding system further comprises heating means for heating the mould structure. The heating means may comprise an oven or a built-in heating system in a moulding system, preferably comprising a lid for closing the mould structure.

In another embodiment, the moulding system further comprises an airtight lid for closing the moulding surface against the surroundings. This is advantageous applying heat and/or negative pressure to the mould structure.

It is also preferred that the moulding system further comprises vacuum generating means. Typically, a vacuum bag or foil will be applied around the fibre material and binding agent arranged on the moulding surface. In a preferred embodiment, the airtight lid comprises an air outlet for permitting a withdrawal of air from the mould structure by the vacuum generating means. Thus, the airflow could be generated and passed through the perforated sheet simultaneously or in an alternating mode with the vacuum application. Thus, the system can be fine-tuned to allow a suitable compromise between efficient heating of the layers and a sufficient amount of consolidation.

In a preferred embodiment, the moulding system further comprises a table for receiving and fixing the mould structure, wherein the table comprises at least one air inlet for permitting the airflow generated by the airflow generation means to pass through the table towards the mould structure. The table advantageously provides a cavity for receiving the mould structure. The mould structure may comprise an at least partly perforated sheet received in a frame or cassette fitting within the cavity of the table. The cavity and the frame/cassette are preferably rectangular.

Preferably, the moulding surface is a curved surface. The moulding surface may be a concave or convex surface. Thus, the mould structure may comprise a curved, concave or convex surface.

In a preferred embodiment, the moulding system further comprises a vacuum foil comprising one or more channels for recycling air flowing through the moulding system In another aspect, the present invention relates to a method of manufacturing a preform for a wind turbine blade, the method comprising the steps of
providing a mould structure having a moulding surface comprising an at least partly perforated sheet,
arranging a fibre material and a binding agent on the moulding surface,
generating and passing an airflow having a temperature of between 40 and 200° C. through the perforated sheet towards the moulding surface containing the fibre material and the binding agent.

In a preferred embodiment, the mould structure is heated during the passing of the airflow through the perforated sheet. Usually, a vacuum bag or foil is subsequently placed on the fibre material and the binding agent, and negative pressure can be applied to the fibre material and the binding agent to consolidate the same. Preferably, the airflow has a temperature of between 60 and 200° C., such as between 80 and 150° C. The binding agent may advantageously be the same as described above in relation to the other aspects of the present invention. The same applies to the fibre material.

In a preferred embodiment, the moulding surface is closed against the surroundings after arranging the fibre material and the binding agent on the moulding surface, preferably using an airtight lid.

Advantageously, the method further comprises the step of applying negative pressure to the fibre material and the binding agent for consolidating the preform.

In another embodiment, the method further comprises the step of recycling air flowing through the moulding system. This may be achieved by providing a foil, such as a silicone foil, having one or more channels, wherein the channels may also be used to apply negative pressure to the fibre material and the binding agent.

The holes or perforations can be of any shape, such as round, rectangular, triangular, circular or a combination thereof. The ratio of the surface area between perforated area and solid area should be such that at least 5%, such as at least 10%, at least 25 or at least 50% of the total surface area is perforated area.

As used herein, the term "longitudinal" means the axis running substantially parallel to the maximum linear dimension of the moulding surface.

As used herein, the term "transverse" means the axis running substantially perpendicular to the maximum linear dimension of the moulding surface, and preferably substantially parallel to the ground surface. Usually, the transverse direction will be substantially parallel to the width extension of the mould structure.

As used herein, the term "substantially" usually means what is specified, but may deviate from the specified amount by 15% or less, 10% or less or 5% or less.

As used herein, the term "wt %" means weight percent. The term "relative to the weight of the fibre material" means a percentage that is calculated by dividing the weight of an agent, such as a binding agent, by the weight of the fibre material. As an example, a value of 1 wt % relative to the weight of the fibre material corresponds to 10 g of binding agent per kilogram of fibre material.

As used herein, the term "perforated" refers to a surface having a plurality of holes or passages distributed regularly or irregularly thereon that extend through the surface. The perforations or holes are designed to allow airflow to pass through the perforated sheet.

DETAILED DESCRIPTION OF THE INVENTION

Figure 2:
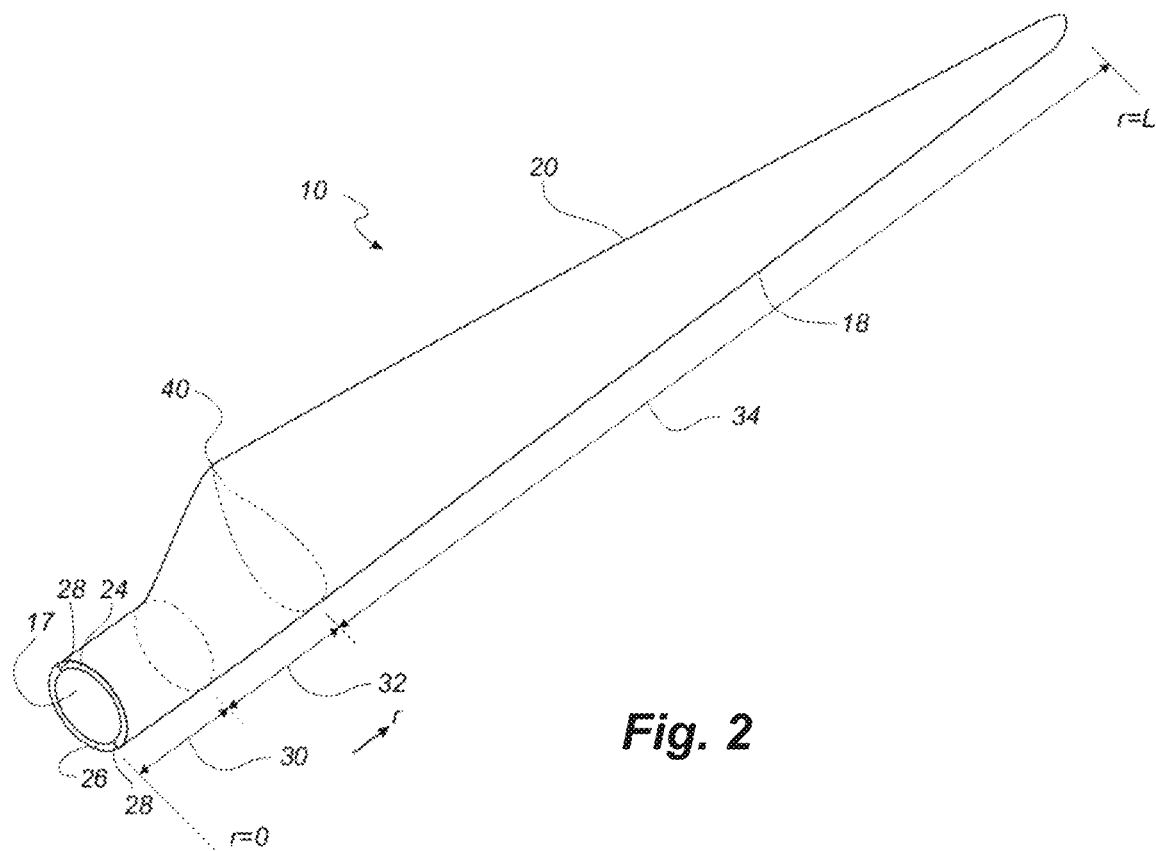
Figure 3:
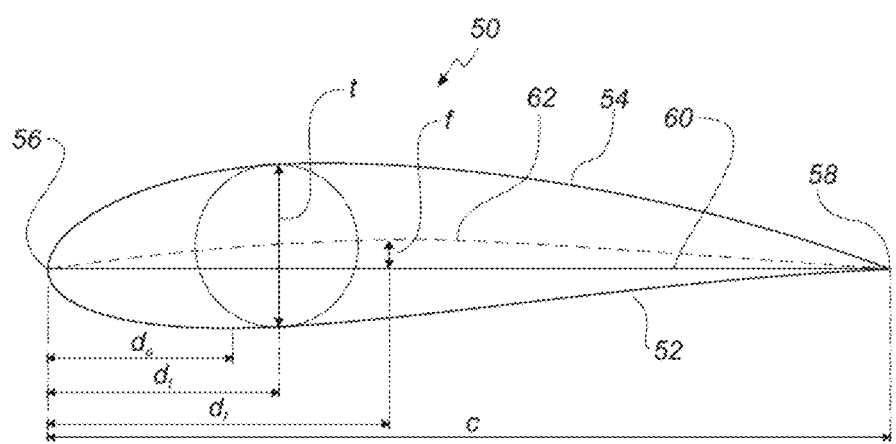
Figure 4:
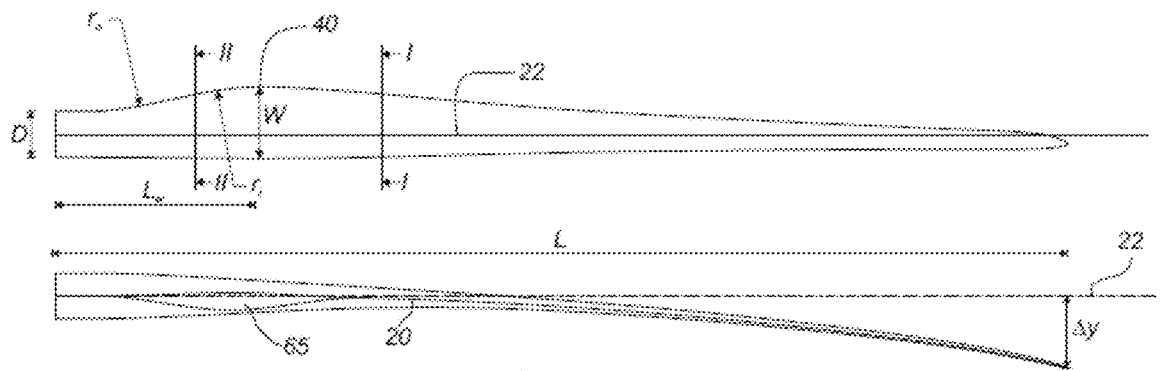
Figure 5:
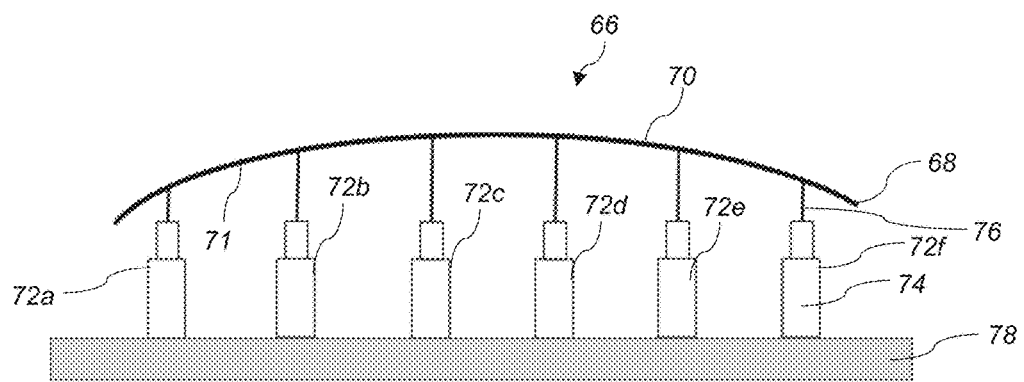
Figure 6:
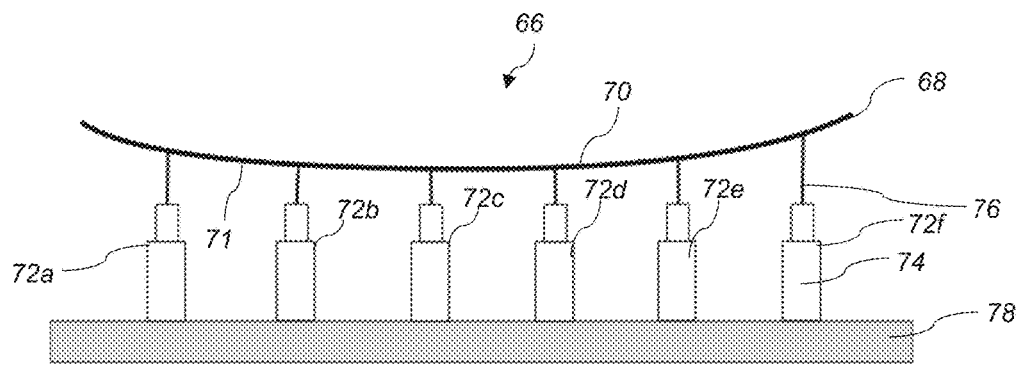
Figure 7:
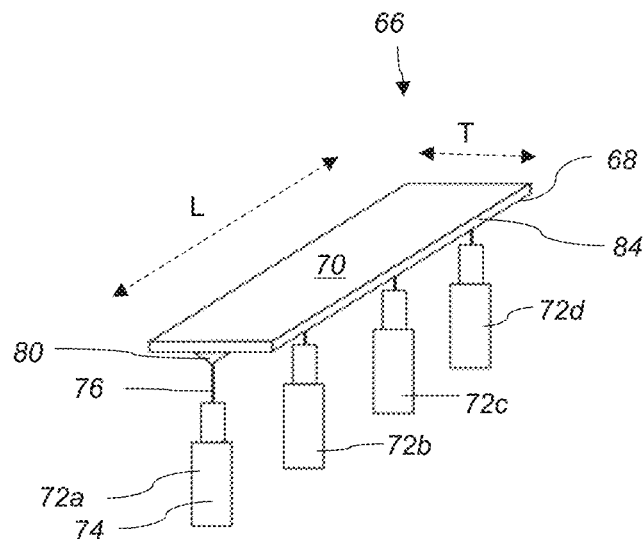
Figure 8:
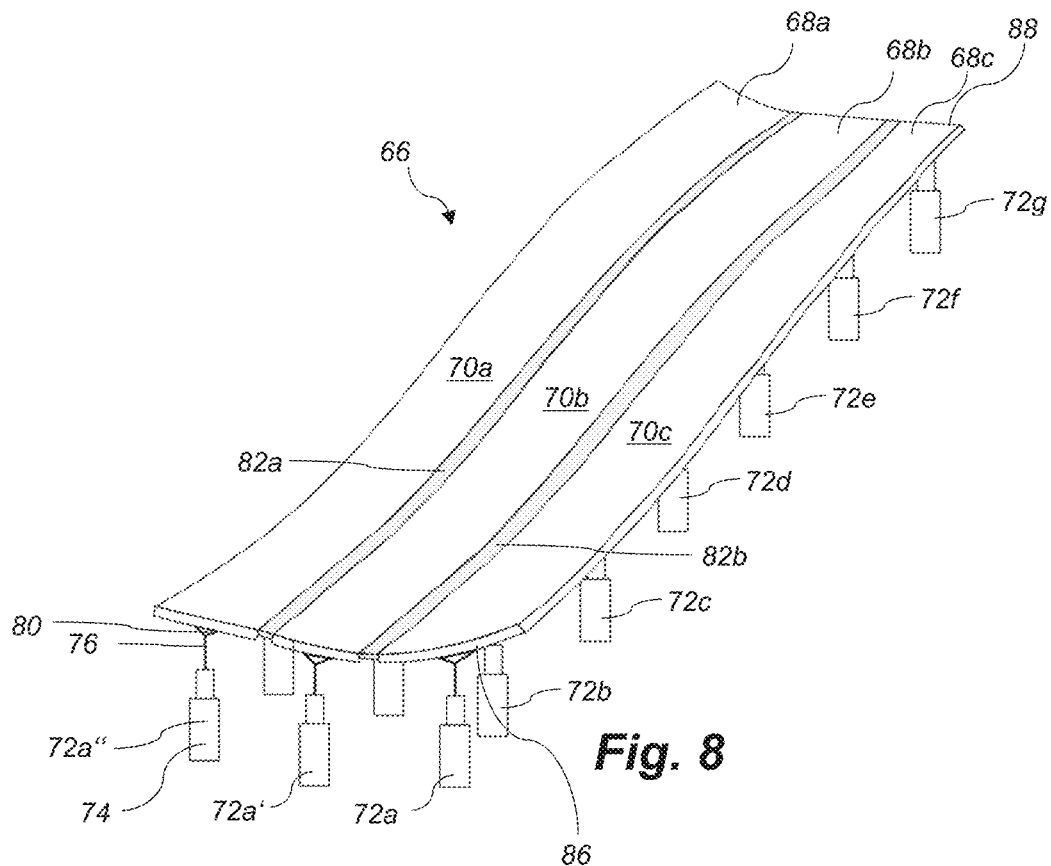
Figure 9:
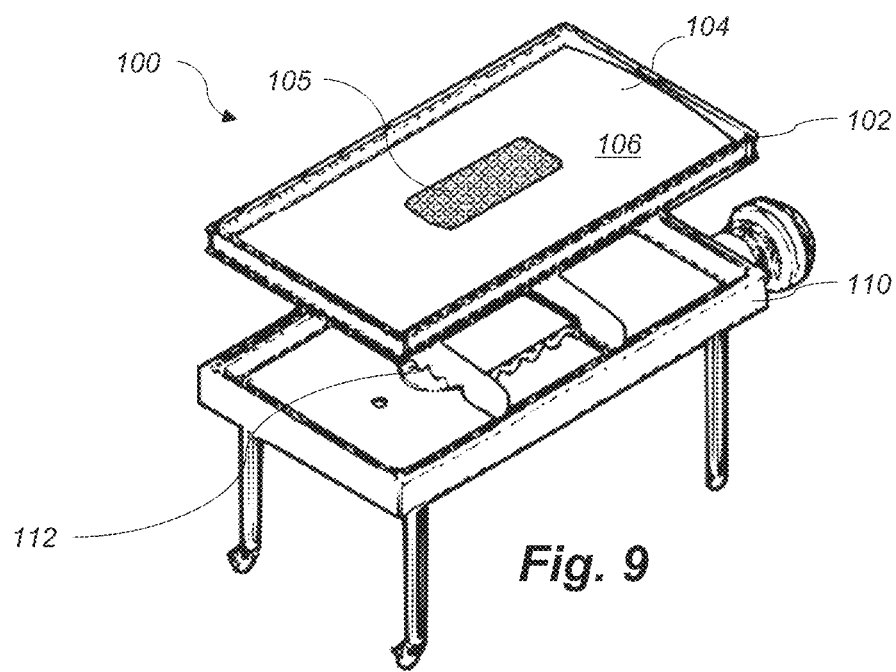
Figure 10:
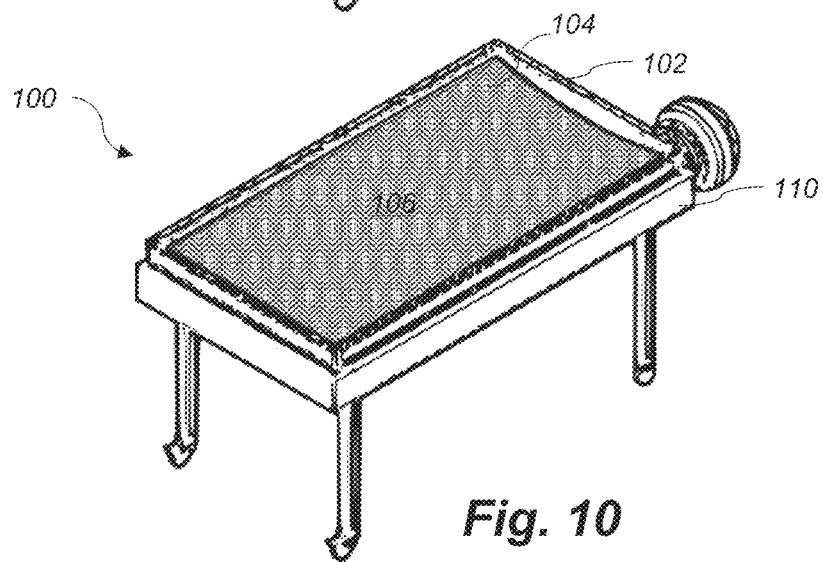
Figure 11:
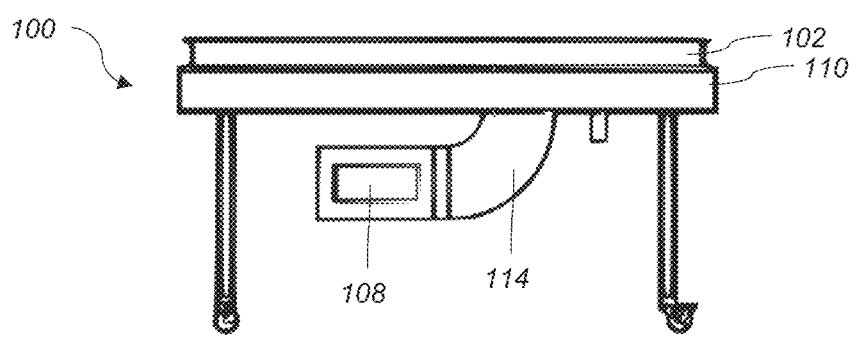
Figure 12:
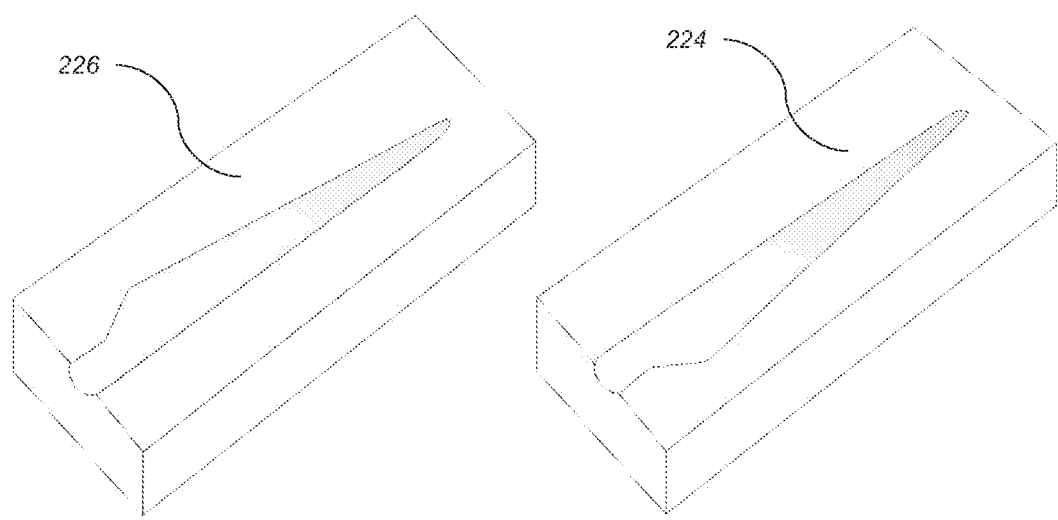

The invention is explained in detail below with reference to embodiments shown in the drawings, in which
FIG. 1 shows a wind turbine,
FIG. 2 shows a schematic view of a wind turbine blade,
FIG. 3 shows a schematic view of an airfoil profile through section I-I of FIG. 4,
FIG. 4 shows a schematic view of the wind turbine blade, seen from above and from the side,
FIG. 5 is a schematic side view of a preform mould structure of the present invention having a moulding surface in first configuration,
FIG. 6 is a schematic side view of a preform mould structure of the present invention having a moulding surface in second configuration,
FIG. 7 is a perspective view of one embodiment of a preform mould structure according to the present invention,
FIG. 8 is a perspective view of another embodiment of a preform mould structure according to the present invention,
FIG. 9 is a perspective view of a moulding system for manufacturing a preform according to the present invention,
FIG. 10 is a perspective view of a moulding system according to another embodiment of the present invention,
FIG. 11 is a side view of a moulding system for manufacturing a preform according to the present invention, and
FIG. 12 is a perspective view showing a mould for moulding an upwind blade half and a mould for moulding a downwind blade half according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as $\Delta y$, which corresponds to the out of plane deflection from a pitch axis 22 of the blade.

FIG. 5 illustrates a side view of a mould system 66 according to the present invention for manufacturing a preform for moulding a wind turbine blade. The system 66 comprises a preform mould structure 68, comprising a bendable sheet, having a curved moulding surface 70 of a substantially convex shape corresponding to a first configuration of the moulding surface 70. The moulding surface 70 can be provided as part of a bendable sheet, such as a bendable steel sheet, or it could be fixed to the same. The preform mould structure 68 also has an opposing bottom surface 71. In the embodiment shown in FIG. 5 the mould structure is supported by several actuators 72a-f. Each actuator comprises a fixed hollow cylinder 74 and a movable rod 76, which is movable with respect to the fixed part 74, connecting to the mould structure 68. The actuators may be supported directly on a ground surface 78 or via a suitable floor plate.

As shown in FIG. 6, the moulding surface 70 can be changed to a substantially concave shape corresponding to a second configuration of the moulding surface 70. This is achieved by way of the actuators 72a-f which can change the shape of the mould structure 68 via their respective movable rods 76, which can be extended or retracted as needed. The first and the second configuration differ in terms of the curvature of the moulding surface 70 in the longitudinal direction L of the moulding surface 70, as indicated by the dashed line in FIG. 7. Thus, the preforms manufactured using the mould system of the present invention can be used both for an upwind blade half and for a downwind blade half, using the same preform mould. FIG. 12 shows a mould 224 for moulding an upwind blade half and a mould 226 for moulding a downwind blade half. The preforms may be arranged in the moulds 224, 226, optionally together with additional material.

FIG. 7 is a perspective drawing of a mould system 66 according to the present invention. The system has a mould structure 68 having a moulding surface 70, which is shown in a substantially plane configuration. The mould structure 68 which here takes the form of a bendable sheet 68 is supported by a number of actuators 72a-d. Each actuator comprises a fixed hollow cylinder 74 and a movable rod 76, which is movable with respect to the fixed part 74, connecting to the mould structure 68, preferably through a connecting element 80, which is wedge-shaped in the illustrated embodiment. FIG. 7 also shows the longitudinal direction L and the transverse direction T of the moulding surface 70, and a longitudinal edge 84 of the sheet 68.

FIG. 8 shows a perspective view of another embodiment of the mould system 66 of the present invention. Here, the moulding surface 70a-c is provided on three bendable sheets 68a-c, wherein adjacent sheets are hingedly interconnected along their longitudinal edges by respective elastic strips 82a, 82b. One actuator 72a, 72a', 72 a" is provided at a front end 86 of each sheet and one actuator 72g is provided at a rear end 88 of each sheet (only shown for sheet 68 c), with multiple actuators 72b-f installed in between. Thus, the curvature of the moulding surface can be varied both in the longitudinal direction L and in the transverse direction T of the moulding surface.

FIG. 9 is an exploded perspective view illustrating one embodiment of a moulding system 100 for manufacturing a preform for a wind turbine blade according to another aspect of the present invention. The moulding system 100 comprises a mould structure 102 having the form of a frame or cassette, comprising an at least partly perforated sheet 104, the sheet comprising a moulding surface 106 for moulding a preform. In the illustrated embodiment, the perforations or holes are shown as substantially circular. The mould structure 102 is received in a table 110 for receiving and fixing the mould structure. The table comprises an air inlet 112.

In the embodiment shown in FIG. 9, the sheet is only partially perforated, i.e. in a centre section 105. By contrast, the sheet 104 and moulding surface 106 of the embodiment shown in FIG. 10 (assembled view) are completely perforated. In the embodiment shown in FIG. 9, the moulding surface 106 is a convex surface. By contrast, in the embodiment shown in FIG. 10, the moulding surface 106 is a concave surface.

As seen in the side view of FIG. 11, the moulding system 100 of FIGS. 9-11 also comprises airflow generation means 108, which may take the form of a fan or air pump, for inducing airflow to pass through the perforated sheet 104 towards the moulding surface 106. The air, preferably hot air, can be transported to the moulding surface 106 through a conduit 114 and through the air inlet 112 of the table 110. When manufacturing preforms, a fibre material and a binding agent are arranged on the moulding surface 106. Subsequently, an airflow having a temperature of between 40 and 200° C. is passed through the perforated sheet 104 towards the moulding surface 106 containing the fibre material and the binding agent.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
66 mould system
68 preform mould structure
70 moulding surface
71 bottom surface of sheet
72 actuator
74 hollow cylinder
76 movable rod
78 ground surface
80 connection element
82 elastic strip
84 longitudinal edge of sheet
86 front end of sheet
88 rearend of sheet
100 moulding system
102 mould structure
104 (partly) perforated sheet
105 perforated center section
106 moulding surface
108 airflow generation means
110 table
112 air inlet
c chord length
$d_t$ position of maximum thickness
$d_f$ position of maximum camber
$d_p$ position of maximum pressure side camber
f camber
L blade length
r local radius, radial distance from blade root
t thickness
Δy prebend

The invention claimed is:

1. A method of manufacturing at least two preforms for moulding a wind turbine blade, the at least two preforms including at least one preform having a first shape and at least one preform having a second shape, the second shape being different from the first shape, the method comprising the steps of:
    providing a preform mould structure (68) having a moulding surface (70) of variable shape such that the shape of the moulding surface (70) can be varied at least between a first and a second configuration, wherein the first configuration and the second configuration have different curvatures of the moulding surface (70) in a longitudinal direction of the moulding surface (70);
    providing at least one actuator (72) for changing the shape of the moulding surface (70) between the first and the second configuration;
    moulding at least one preform for an upwind blade half having the first shape on the moulding surface (70) having the first configuration; and
    moulding at least one preform for a downwind blade half having the second shape on the moulding surface (70) having the second configuration,
    wherein the upwind blade half and the downwind blade half correspond to the same wind turbine blade, and
    wherein the step of moulding the at least one preform for the upwind blade half and the step of moulding the at least one preform for the downwind blade half are both performed using preform mould structure (68).

2. The method according to claim 1, wherein the shape of the moulding surface can be varied across the entire moulding surface.

3. The method according to claim 1, wherein the first and the second configuration differ in terms of the curvature of the moulding surface (70).

4. The method according to claim 1, wherein the first and the second configuration do not differ in terms of the curvature of the moulding surface (70) in the transverse direction of the moulding surface (70).

5. The method according to claim 1, wherein the preform is for use in a main laminate portion of the wind turbine blade.

6. The method according to claim 1, wherein the moulding surface (70) can be varied between a concave shape and a convex shape.

7. The method according to claim 1, wherein the moulding steps comprises laying a fibre material and a binding agent onto the moulding surface (70).

8. The method according to claim 1, wherein the moulding surface (70) is provided on one or more bendable sheets (68).

9. The method according to claim 8, wherein the one or more bendable sheets (68) comprise one or more bendable steel sheets.

10. The method according to claim 1, wherein the moulding surface (70) is provided on a single bendable sheet, and wherein one actuator is provided at a front end of the sheet and one actuator is provided at a rear end of the sheet.

11. The method according to claim 1, wherein the moulding surface (70) is provided on two or more bendable sheets (68a, 68b, 68c), wherein adjacent sheets are hingedly interconnected along their longitudinal edges (84), and wherein one actuator (72) is provided at a front end of each sheet and one actuator (72) is provided at a rear end of each sheet.

12. The method according to claim 11, wherein the sheets are hingedly interconnected by one or more elastic strips provided in between adjacent sheets.

13. The method according to claim 1, the method comprises providing at least three actuators (72) for changing the shape of the moulding surface between the first and the second configuration.

14. A method of manufacturing a wind turbine blade, the method comprising the steps of:
  manufacturing respective preforms for moulding an upwind blade half and a downwind blade half according to the method of claim 1, wherein the same preform mould is used for at least one preform for the upwind blade half and for the downwind blade half, respectively;
  arranging the preforms in respective upwind blade moulds and downwind blade moulds, optionally together with additional material;
  infusing resin into the respective upwind blade moulds and downwind blade moulds containing the preforms;
  curing or hardening the resin in order to form an upwind blade half and downwind blade half; and
  joining the upwind blade half and the downwind blade half to form a wind turbine blade.

* * * * *